Patented Oct. 6, 1942

2,297,734

UNITED STATES PATENT OFFICE 2,297,734

STABILIZATION OF NITRATED CARBOHYDRATES

Joseph A. Wyler and Richard N. Boyd, Allentown, Pa., assignors to Trojan Powder Company, Allentown, Pa.

No Drawing. Application December 26, 1940, Serial No. 371,824

10 Claims. (Cl. 260—223)

This invention relates to the stabilization of nitrated carbohydrates in general, and to nitrated starch, nitrated cellulose and nitrated sucrose in particular. The present application is a continuation-in-part for our application of Serial Number 257,482 filed February 20, 1939.

Many processes for improving the stability of nitrated carbohydrates are known. Among these is the use of certain alkaline agents as $Na_2CO_3$, $NaHCO_3$, $NaOH$, etc. These agents are usually used in the form of 1-2% water solutions in which the nitrated carbohydrate is suspended for varying lengths of time, after which the mixture is filtered and washed with water. Other processes are based upon the purification of the nitrated carbohydrate by repeated water boils followed by alkaline water treatments of the filtered material. And still other processes are based upon the incorporation of certain agents as diphenylamine, dicyandiamide, and triphenylamine in powdered condition into the final dry nitrated carbohydrate. Each of these processes or agents has certain limitations which adversely affect the usefulness of the finished product.

We have discovered a combination of steps which if followed will satisfactorily stabilize nitrated carbohydrates and simultaneously produce a finished product of excellent characteristics and special utility.

An object of our invention is to stabilize nitrostarch without producing any appreciable yellow color therein. This is a very useful accomplishment particularly if the nitrostarch is to be used in colorless lacquers and plastics. Another object is to stabilize nitrocellulose, although there is less tendency for the formation of yellow colored products when nitrocellulose is made slightly alkaline than when nitrostarch is made alkaline. A still further object is to stabilize nitrated sucrose, in which case, it is necessary to control temperatures of "boil" treatments more carefully than for nitrostarch or nitrocellulose. Otherwise, the processes are identical. Other and further objects will become apparent upon a perusal of this specification.

We have discovered that if a nitrated carbohydrate, such as nitrated starch, nitrated cellulose, and nitrated sucrose, which is in an acid condition just after the nitration and drowning steps and has been given several water washes for the purpose of removing most of its free acid, is stirred in a large excess of hot water for hours, filtered, stirred in a cold 1-3% solution of $NaHCO_3$ in water for from one hour to several days, filtered, washed with water until only a small amount of $NaHCO_3$ remains in the nitrated product, preferably an amount which produces a pH of 7.1 to 8.2 in the water which is in contact with the nitrated carbohydrate, and then stirred in a cold 0.1%-0.2% solution of dicyandiamide for from one hour to several days, filtered, washed imperfectly with water so as to allow some dicyandiamide to remain in the filter cake, a nitrated product results, which is particularly free from color and is of satisfactory stability.

In order to more clearly point out our invention we give the following examples in which all parts are by weight.

Example 1

About 100 parts of an acid nitrostarch (directly after nitration, followed by water washing) are placed in a suitable tank provided with a stirrer and steam heating coils, and containing about 500 parts of water. The mixture is heated up to about 85-95° C. with stirring and kept at approximately this temperature for from one hour to several hours, after which it is filtered, washed with water and transferred to a tank containing about 500 parts of a 1% $NaHCO_3$ solution. This mixture is stirred for several hours or more, filtered, washed with water until the wash waters have a pH of about 7.6 and filter cake thrown into a tank containing about 500 parts of a 0.2% solution of dicyandiamide in water and stirred for several hours to several days at a temperature of 10°-30° C. The mixture is filtered, filtrate saved for possible reuse and filter cake given one to three washes with water. The aim of this final water wash is to remove only the major portion of the dicyandiamide, leaving some in the filter cake. The latter is then dried in a current of air at a temperature of 40°-70° C. This dried product is the stabilized nitrostarch.

Example 2

About 100 parts of an acid nitrocellulose (directly after nitration, followed by water washing) are handled in essentially the same manner as the nitrostarch in Example 1, except that in the present example we prefer to use a somewhat higher temperature in the "boil." A temperature of 98°-100° C. is preferable.

Example 3

About 100 parts of crystalline nitrated sugar (directly after nitration followed by alcohol and water washing) are handled in essentially the same manner as the nitrostarch in Example 1, except that in the present case we prefer to use a lower temperature (40°-60° C.) in the "boil."

It will thus be clear that we start out with an acid, nitrated carbonhydrate, "boil" the latter in a slightly acid, aqueous medium, remove excess acid by means of a dilute aqueous sodium bicarbonate solution, remove the major portion of the sodium bicarbonate, impregnate the nitrated carbohydrate with dicyandiamide in an aqueous medium of controlled pH before the dicyandiamide is added, and wash the nitrated carbohydrate with water or alcohol in such a manner as to allow a small amount of the dicyandiamide to be held by the nitrated carbohydrate.

In this connection it is important to note that the dicyandiamide is added to a nitrated carbohydrate-water mixture in which the water solution surrounding the nitrated carbohydrate is on the alkaline side (pH 7.1 to 8.2). A water solution of commercial dicyandiamide has a pH of 7.0, consequently, when the dicyandiamide is introduced into the nitrated carbohydrate-water-sodium bicarbonate mixture of pH 7.1 to 8.2 the resulting mixture will be only slightly alkaline. Under such conditions the nitrated carbohydrate itself will still be acid, usually having a pH of 6.0 to 6.8 depending upon the length of time of contact of the reagents, the temperature, etc.

We are aware that sodium bicarbonate has been used to neutralize or stabilize nitrated carbohydrates, that hot water "boils" are known methods for removing most of the acid in nitrated carbohydrates, and that dicyandiamide has been used in solid form, or in solution in alcohol and camphor to produce stabilized nitrocellulose compositions, but our invention lies in the novel manner in which we apply the dicyandiamide in the amount used, and also in the combination of steps comprising this novel dicyandiamide treatment.

In all known cases where dicyandiamide has been used the amount used in any given composition is far too much. In our dry compositions we never exceed, say 0.05%, and prefer to use only about 0.01% of dicyandiamide. If, say, 0.10% is used in the case of nitrocellulose the stability of the latter toward light is definitely poorer than when only 0.10% is present. By means of our method for applying dicyandiamide we obtain a more even and uniform distribution and impregnation of the dicyandiamide upon and within the granules of nitrated carbohydrate, thus providing a composition which is very stable toward heat and light even though only a small amount of dicyandiamide is actually present.

Similarly, although sodium bicarbonate has been used in general for stabilization of nitrated carbohydrate, its use with dicyandiamide in accordance with our process is, so far as we are aware, new. Sodium bicarbonate alone does not give a product of suitable heat and light stability, but when combined with dicyandiamide in the manner indicated it does. We have also discovered that the sodium bicarbonate, when used on nitrated starch, neutralizes the excess acid present in the nitrated starch, without producing any appreciable yellow coloration in the product. This is a very significant result, and consequently, when the sodium bicarbonate treatment is combined with the dicyandiamide treatment we obtain a practically colorless nitrated carbohydrate which is of satisfactory stability toward heat, and simultaneously, is definitely more stable toward the actinic rays of the sun. This is the new and useful result obtained by our process and composition of matter.

Also, the acid-water "boil" treatment step is not new. However, when it is combined with the other steps in our process the combination thus made produces an improved product which cannot be made by any of the steps without the acid boil step.

We wish to emphasive that the examples given above are merely illustrative of the invention and that we may vary any of the operative details in any manner that would occur to a workman skilled in this art. Thus, we may vary the proportion of acid nitrated carbohydrate to water, sodium bicarbonate solution, or dicyandiamide solution; the strength of the bicarbonate or dicyandiamide solution; the length of time of contact with the sodium bicarbonate or the dicyandiamide and other operative details.

Also, although our process is operative on nitrated carbohydrates in general, the utility of each nitrated product is different. For instance, nitrocellulose receives less tinting during the process than does nitrostarch and therefore finds usefulness in certain plastic materials in which the use of nitrostarch is precluded. Similarly, nitrated sucrose receives a different type of stability toward heat than do either nitrocellulose or nitrostarch. In the case of nitrocellulose and of nitrostarch the stability is of such a nature that if a sample of either of these is heated at 100° C., it may eventually ignite, but in the case of nitrated sugar it will decompose slowly, and, on the basis of numerous tests, will not detonate or catch fire. Consequently, this sucrose octanitrate finds usefulness in certain particular explosive compositions in preference to nitrocellulose or nitrostarch.

We claim:

1. The process for stabilizing a nitrated carbohydrate which comprises simutlaneously contacting the nitrated carbohydrate with a water solution of sodium bicarbonate, having a pH of 7.1 to 8.2 and a 0.2% (by weight) solution of dicyandiamide in water, at a temperature of 10° to 30° C.

2. The process for stabilizing a nitrated carbohydrate which comprises stirring about 1 part (by weight) of nitrated carbohydrate, with a mixture consisting of about 1 part (by weight) of a water solution of $NaHCO_3$ of pH 7.1 to 8.2 and about 5 parts (by weight) of a 0.2% (by weight) solution of dicyandiamide in water at a temperature of 10°-30° C. for from 1 to 48 hours.

3. The process for stabilizing nitrated starch which comprises contacting the nitrated starch with a mixture consisting of a water solution of $NaHCO_3$ of pH 7.1 to 8.2 and a 0.2% (by weight) solution of dicyandiamide in water, at a temperature of 10° C. to 30° C.

4. The process for stabilizing nitrated cellulose which comprises contacting the nitrated cellulose with a mixture consisting of a water solution of $NaHCO_3$ of pH 7.1 to 8.2 and a 0.2% (by weight) solution of dicyandiamide in water, at a temperature of 10° C. to 30° C.

5. The process for stabilizing nitrated sucrose which comprises contacting the nitrated sucrose with a mixture consisting of a water solution of $NaHCO_3$ of pH 7.1 to 8.2 and a 0.2% (by weight) solution of dicyandiamide in water, at a temperature of 10° C. to 30° C.

6. The process for stabilizing a nitrated carbohydrate which comprises stirring the slightly acid nitrated carbohydrate in hot water for at least one hour, filtering, stirring the filter cake in a cold 1% solution of sodium bicarbonate in water for at least one hour, filtering, washing with water until the pH of the wash water is 7.1 to 8.2, stirring the filter cake in a 0.2% solution of dicyandiamide in water at a temperature of 10° to 30° C. for at least one hour, filtering, washing one to three times on the filter and drying.

7. The process for stabilizing nitrated starch which comprises stirring the slightly acid nitrated starch in hot water for at least one hour, filtering, stirring the filter cake in a cold 1% solution of sodium bicarbonate in water for at least one hour, filtering, washing with water until the wash water has a pH of 7.1 to 8.2, stirring the filter cake in a 0.2% solution of dicyandiamide in water at a temperature of 10° to 30° C. for at least one hour, filtering, washing one to three times on the filter and drying.

8. The process for stabilizing nitrated sucrose which comprises stirring the slightly acid nitrated sucrose in hot water for at least one hour, filtering, stirring the filter cake in a cold 1% solution of sodium bicarbonate in water for at least one hour, filtering, washing with water until the wash water has a pH of 7.1 to 8.2, stirring the filter cake in a 0.2% solution of dicyandiamide in water at a temperature of 10° to 30° C. for at least one hour, filtering, washing one to three times on the filter and drying.

9. The process for stabilizing nitrated cellulose which comprises stirring the slightly acid nitrated cellulose in hot water for at least one hour, filtering, stirring the filter cake in a cold 1% solution of sodium bicarbonate in water for at least one hour, filtering, washing with water until the wash water has a pH of 7.1 to 8.2, stirring the filter cake in a 0.2% solution of dicyandiamide in water at a temperature of 10° to 30° C. for at least one hour, filtering, washing one to three times on the filter and drying.

10. A composition of matter comprising a nitrated carbohydrate and dicyandiamide, the dicyandiamide being present in an amount not in excess of 0.05% by weight and applied in accordance with the process of claim 6.

JOSEPH A. WYLER.
RICHARD N. BOYD.